United States Patent
Breivik et al.

(10) Patent No.: US 6,630,188 B1
(45) Date of Patent: Oct. 7, 2003

(54) STABILIZATION OF PIGMENTS AND POLYUNSATURATED OILS

(75) Inventors: Harald Breivik, Skjelsvik (NO); Lola Irene Sanna, Porsgrunn (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/720,669

(22) PCT Filed: Jun. 25, 1999

(86) PCT No.: PCT/NO99/00216

§ 371 (c)(1),
(2), (4) Date: Dec. 29, 2000

(87) PCT Pub. No.: WO00/01249

PCT Pub. Date: Jan. 13, 2000

(30) Foreign Application Priority Data

Jul. 1, 1998 (NO) .............................. 19983050

(51) Int. Cl.[7] .............................. A23K 1/16; A23K 1/18
(52) U.S. Cl. ..................... 426/321; 426/601; 426/610; 426/656; 426/805
(58) Field of Search ................. 426/321, 601, 426/656, 610, 805

(56) References Cited

U.S. PATENT DOCUMENTS

| | | | | |
|---|---|---|---|---|
| 2,875,060 A | * | 2/1959 | Holman ............................ | 99/2 |
| 3,186,909 A | * | 6/1965 | McMurtry et al. ............. | 167/81 |
| 3,502,478 A | * | 3/1970 | Erwin ............................... | 99/2 |
| 3,748,319 A | * | 7/1973 | Tolle et al. ................. | 260/96.5 |
| 3,872,030 A | | 3/1975 | Feins et al. .................. | 252/465 |
| 4,145,446 A | * | 3/1979 | Kurucz et al. ................. | 426/69 |
| 4,970,209 A | * | 11/1990 | Wretland et al. ........... | 514/221 |
| 5,502,077 A | * | 3/1996 | Breivik et al. .............. | 514/560 |
| 5,656,667 A | * | 8/1997 | Breivik et al. .............. | 514/568 |

FOREIGN PATENT DOCUMENTS

| | | | |
|---|---|---|---|
| CA | 993029 | * | 9/1973 |
| CA | 984832 | * | 3/1976 |
| EP | 0460952 | * | 6/1990 |
| EP | 0 574 974 | | 12/1993 |
| FR | 2 414 303 | | 5/1984 |
| GB | 704439 | * | 2/1954 |
| GB | 993139 | | 5/1965 |
| GB | 2288811 | | 11/1995 |
| SU | 532371 | | 9/1974 |
| WO | 87/03899 | * | 7/1987 |
| WO | 96/12415 | | 5/1996 |

OTHER PUBLICATIONS

S.J. Kaushik, et al., "Utilization of Dietary Urea in Rainbow Trout," Annals of Nutrition Metabolism, vol. 27, pp. 94–106, (1983).

* cited by examiner

*Primary Examiner*—Chhaya Sayala
(74) *Attorney, Agent, or Firm*—Fitzpatrick, Cella, Harper & Scinto

(57) ABSTRACT

The present invention relates to a method for stabilizing vegetable and animal oils as well as pigments like astaxanthin and canthaxanthin with regard to oxidation. It also relates to a feed for salmonids, and a method for optimising the effect of the pigment in feed for salmonids. Essential feature by the invention are treatment by or presence of urea.

22 Claims, 5 Drawing Sheets

STABILIZATION OF PIGMENTS AND POLYUNSATURATED OILS

This invention relates to a method for stabilising vegetable and animal oils as well as pigments like astaxanthin and canthaxanthin. It also relates to a feed for salmonids, and a method for optimising the effect of the pigment in feed for salmonids.

For the aquaculture industry it has been an economic problem that farmed fish like salmon and trout do not naturally achieve the same strongly red colour as the wild species. Such farmed fish are palely red, if not large amounts of red pigments are artificially supplied, and therefore not as attractive as the wild fish to the customer.

Today pigments like astaxanthin and cantaxanthin are added to the fish feed to make the fish meat more red.

Commercially available astaxanthin products are very expensive and their biological retention is very low (typically 10–12%). In addition astaxanthin is a rather unstable compound, which of course is a drawback. The low stability of astaxanthin is due to oxidation. Commercial pigment products are formulated in order to avoid or reduce oxidation. One typical formulation for astaxanthin is with gelatine and starch. The formulations used are often, however, not optimal with respect to biological availability of the pigment, and a new formulation, combining a high degree of stability with improved biological availability would be of great economical benefit to the aquaculture industry. A more stable pigment is thus highly desired as this would give possibilities for making a formulation more optimal with regard to biological entrance and consequently possibilities for considerably economic saving.

Another problem for the aquaculture industry is degradation and low quality of the fat components in the feed due to oxidation. When marine fat, which is the main fat source in fish feed, reacts with oxygen, firstly primary oxidation products like peroxides are made. Peroxides from polyunsaturated fat are unstable and easily degraded by transformation to secondary oxidation products.

Secondary oxidation products are a complex group of compounds like aldehydes and ketones. To analyse the amount of secondary oxidation products the anisidine value is measured. The anisidine number is the intensity of a colour that develops during reaction between the chemical anisidine and aldehydes in the fat. The anisidine value is given without denomination.

The level of oxidation is often given as totox-value. Totox-value is two times the peroxide value added with the anisidine value.

For fish feed an oil having a totox-value below 20 should be used to secure optimal growth for the fish. It is today difficult to provide oils having a totox-value below 20. Oils with a totox-value of up to 30 are available. By reducing the oxidation oils not nutritional acceptable could be made available as a source for fat in feed. This would be very much appreciated by the aquaculture industry as the supply of fish oils are limited.

Oxidation of fat is a problem also with regard to fat sources like vegetable oils and animal oils other than marine oils.

It has surprisingly been found that by treating fish oils with urea oxidation has been considerably reduced. Even more surprisingly it was notified that oxidation of astaxanthin kept in a fish oil treated by urea was considerably reduced.

The main object of the invention is to provide a method for stabilising vegetable and animal oils with regard to oxidation.

Another main object of the invention is to provide a method for stabilising pigments like astaxanthin and cantaxanthin, with regard to oxidation.

Further, it is an object of the invention to provide a feed for salmonids being improved with regard to storage stability/degradation and biological effect of the pigment.

Still another object of the invention is to provide a method for optimising the effect of the pigment in feed for salmonids.

These and other objects are obtained by treatment or presence of urea as defined in the accompanying claims 1–14.

A preferred feature by this invention is that the oil is treated with urea and added to the fodder before or after extrusion. The oil is treated either by heating in the presence of urea, or by reacting with an aqueous mixture of urea. Another preferred feature is that urea is added directly to the fodder mixture, either in an aqueous phase or in solid form.

In the following the invention will be further explained by examples and attached illustrations FIGS. 1–5. The examples are just meant to be illustrative and shall not be considered as limiting.

EXAMPLE 1

5% urea was added to a fish oil and progressively heated to 140° C. during agitation to dissolve urea in the oil. The melting point for urea is 132.7° C. Samples for analysing were taken during heating at 20, 60, 80, 120, 130 and 140° C. Subsequent to the heating the oil mixture were cooled. Crystallising was observed at ca. 133° C. At room temperature a sample for analysing was taken as well. The samples were filtered and analysed regarding anisidine value. The anisidine value is related to the intensity of the colour that is formed by chemical reactions between anisidine and carbonyl compounds (i.e. aldehydes) in the oil. The analytical procedure as given by the European Pharmacopoeia in the monograph for Cod-liver oil (type A) (3rd Edition, monograph 1998:1192) was used.

Figure 1:
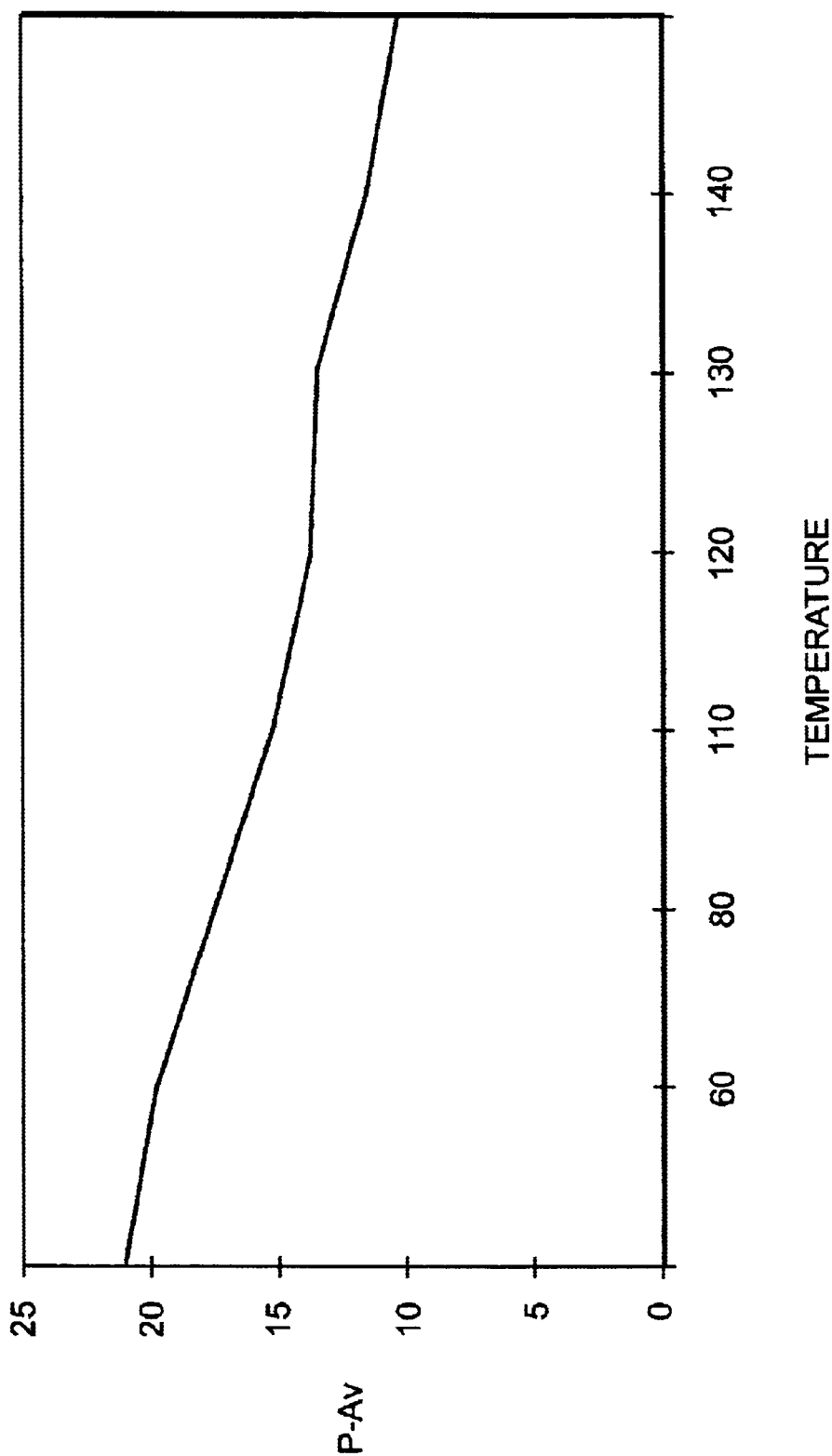
FIG. 1 shows a diagram concerning oxidation with regard to secondary oxidation products, at different temperatures of a fish oil treated by urea.

Before addition of urea the fish oil showed an anisidine value of 21. When heating the oil to 140° C. as described above the anisidine value was progressively decreased, and when cooled to room temperature the anisidine value was 10. These results are shown in FIG. 1.

EXAMPLE 2

5% urea was added to 100 g fish oil and heated to 140° C. and cooled. This oil mixture was continuously agitated by means of magnet agitating at room temperature for 35 days. Samples were taken frequently for analysing.

For comparison 100 g fish oil was continuously agitated by means of magnet agitating at room temperature for 35 days. Samples were taken frequently for analysing.

The samples were filtered and analysed with regard to the anisidine value (p-Av) according to the method given by the European Pharmacopoeia in the monograph for Cod-liver oil (type A) (3rd Edition, monograph 1998:1192).

Figure 2:
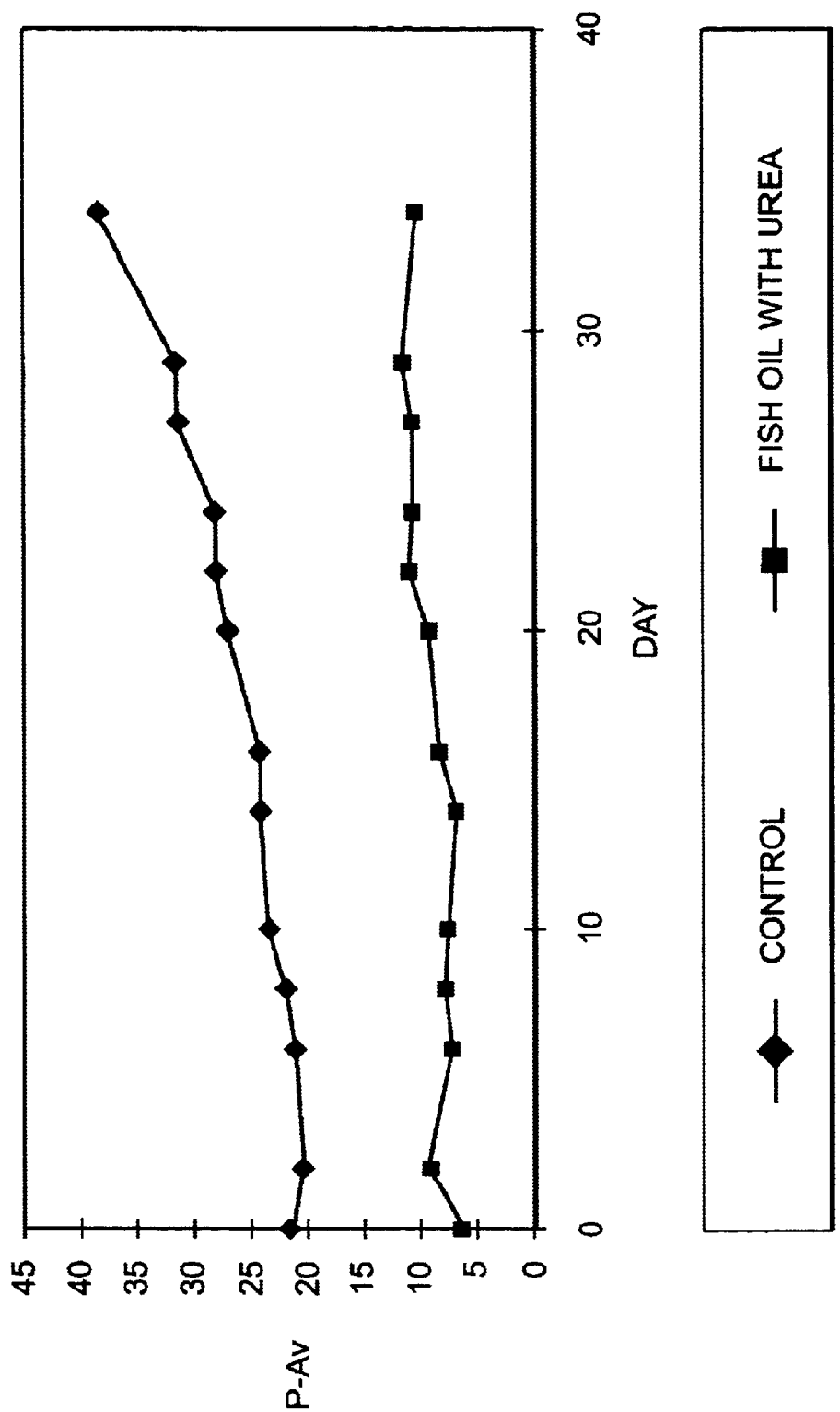
FIG. 2 shows a diagram concerning oxidation with regard to secondary oxidation products, of a fish oil treated by urea compared with oxidation of a fish oil not treated by urea.

At start of the test the control showed a anisidine value of 21.5. When treating the oil by urea the anisidine value was decreased to 6.5. The control showed an increasing anisidine value and at day 34 the anisidine value was 38. The anisidine value for the fish oil treated by urea was 10 at day 34. These results are shown in FIG. 2.

EXAMPLE 3

5% urea was added to 500 g fish oil and heated to 140° C. and cooled to room temperature.

1A) 200 ppm tochopherol, 50 ppm ascorbic acid and 100 ppm astaxanthin were added to 100 g of the fish oil treated by urea.

1B) 200 ppm tochopherol, 200 ppm ascorbic acid and 100 ppm astaxanthin were added to 100 g of the fish oil treated by urea.

1C) 100 ppm astaxanthin was added to 100 g of the fish oil treated by urea.

2A) 200 ppm tochopherol, 50 ppm ascorbic acid and 100 ppm astaxanthin were added to 100 g fish oil.

2B) 200 ppm tochopherol, 200 ppm ascorbic acid and 100 ppm astaxanthin were added to 100 g fish oil.

2C) 100 ppm astaxanthin was added to 100 g fish oil.

The oil samples 1A, 1B, 1C, 2A, 2B, and 2C were placed in an ultrasound bath in ice water for 1 hour to dissolve the antioxidants (tochopherol and ascorbic acid) and the astaxanthin. The homogenous samples were placed in a heating bath at 75° C. having continuously through flow of air. Samples were taken every hour. These samples were filtered and measured at 490 nm on a spectrophotometer. The results of the measurements are given in % Abs.

The % Abs is a value relative to zero where zero refers to the amount at the beginning of the experiment. Thus as the substance is decomposed the % Abs value will become negative. It is also possible that the value may initially increase due to higher solubility of the substance at the experimental temperature.

Figure 3:
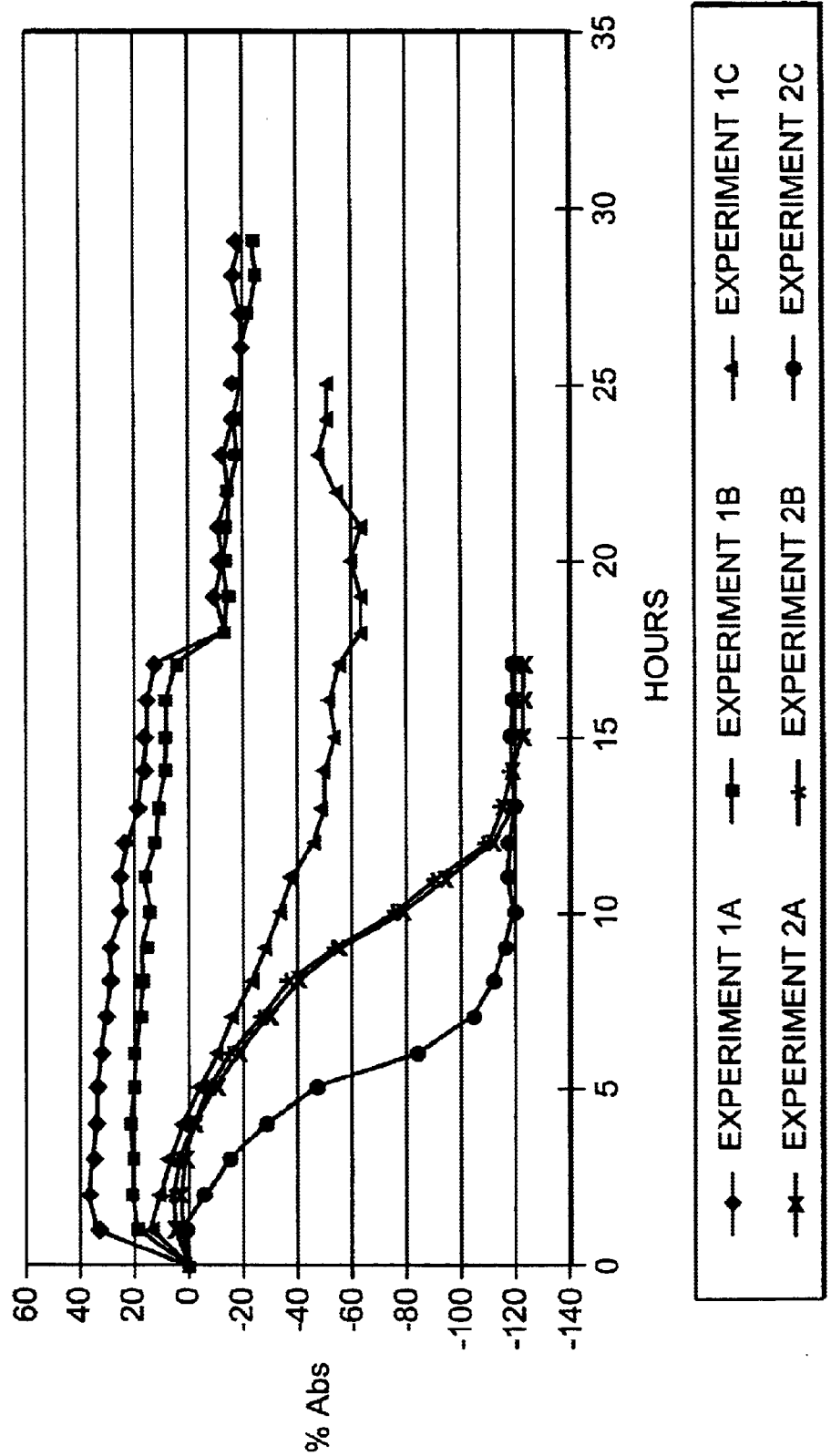
FIG. 3 shows a diagram concerning oxidation of astaxanthin in a fish oil treated by urea and various antioxidants compared to oxidation of astaxanthin, kept in a fish oil not treated by urea but treated by various antioxidants.

These experiments showed that degradation of astaxanthin can be decreased by addition of tochopherol and ascorbic acid to the fish oil. When pretreating the fish oil by urea the degradation is considerable. Tochopherol and ascorbic acid added to pre-treated oil showed a further stabilising effect. These results are shown in FIG. 3.

The ascorbic acid in 1A, 1B, 2A and 2B could be substituted by ascorbyl palmitate or other derivatives of ascorbic acid and also give improved protection compared to fish oil only treated by urea.

EXAMPLE 4

CP-solution (CP=Carophyl Pink): 0.6 g emulgator (glyceryl polyetylenglycolricinoleat), 1.25 g Carophyl Pink (commercial astaxanthin product from Hofmann La Roche) and 10.6 g water were added to a flask during $N_2$ presence and heated to 50° C. This solution contains 100 ppm astaxanthin.

1) 5 g urea and 1.25 g CP-solution at temperature ca. 50° C. were added to 95 g fish oil. The oil mixture was heated to 140° C. and cooled to room temperature.

2) 5 g urea and 1.25 g CP-solution at temperature ca. 50° C. were added to 95 g fish oil. The oil mixture was heated to 140° C. and cooled to room temperature. Precipitated urea was filtered from the oil mixture. This oil mixture contained 570 mg nitrogen/kg.

3) 1.25 g CP-solution at temperature ca. 50° C. was added to 100 g fish oil during constantly agitation. This fish oil contained 54 mg nitrogen/kg.

200 ppm tochopherol and 200 ppm ascorbic acid was added to 1) and 2). The flasks were placed in an ultrasound bath in ice water for 1 hour for homogenising. The homogenous oil samples were placed in a heating bath at 75° C. having continuously through flow of air. Samples were taken every hour. These samples were filtered and measured at 480 nm on a spectrophotometer.

Figure 4:
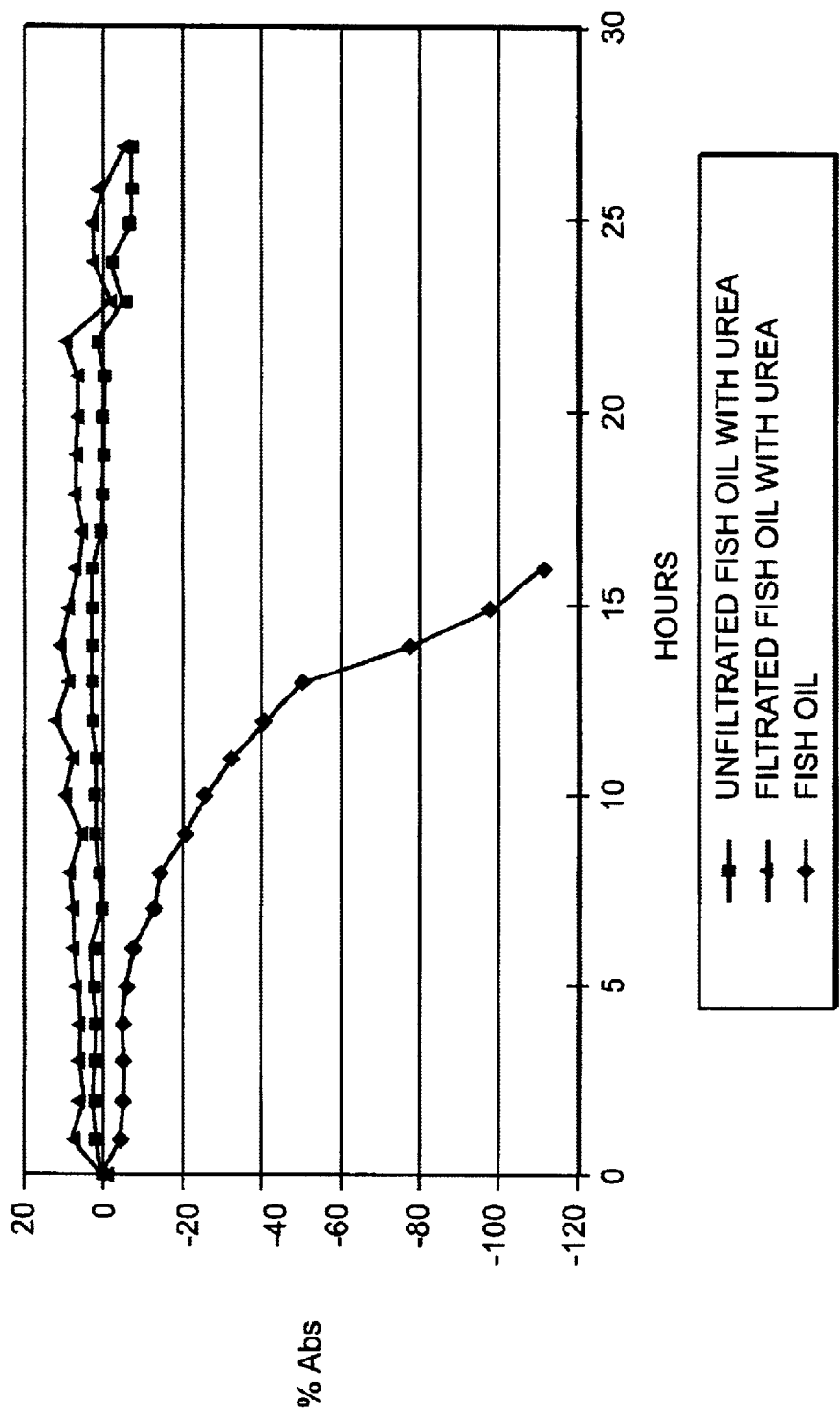
FIG. 4 shows a diagram concerning oxidation of astaxanthin in a fish oil treated by urea compared to oxidation of astaxanthin in a fish oil treated by urea where unsolved urea is removed. Oxidation of astaxanthin in a control with only fish oil is also shown.

2) showed the same properties as 1) with regard to oxidation of astaxanthin. The oils did not show any sign to oxidation of the pigment after 25 hours. After 5 hours the astaxanthin in 3) did start to oxidise and it was completely degraded after 15 hours. These results are shown in FIG. 4.

EXAMPLE 5

5 gram urea was dissolved in 5 gram water. The water was containing 6% of an emulgator (glyceryl polyetylenglycolricinoleat). This solution (10% by weight) was stirred with fish oil (100 gram) at room temperature for 15 minutes. Analysis showed that the anisidine value was reduced from 14.5 to 7.2.

A similar experiment was performed adding only water (with 6% emulgator) to fish oil. After stirring for 15 minutes at room temperature the anisidine value of the oil was 14.5, i.e. no change had occured.

Thus, it can be concluded that urea is the compound reacting with the aldehydes and causing reduction in the anisidine value.

EXAMPLE 6

Experiment 1) Astaxanthin (100 mg/g) was dissolved in fish oil that had been treated with 5% urea at 140° C. 100 g of this oil was bubbled with air at 70° C.

Experiment 2) Astaxanthin (100 mg/g) was added to untreated fish oil. 100 g of this oil was mixed with 5 g urea and 5 g water. The water contained 6% of an emulgator (glyceryl polyetylenglycolricinoleat). The mixture was bubbled with air.

Figure 5:
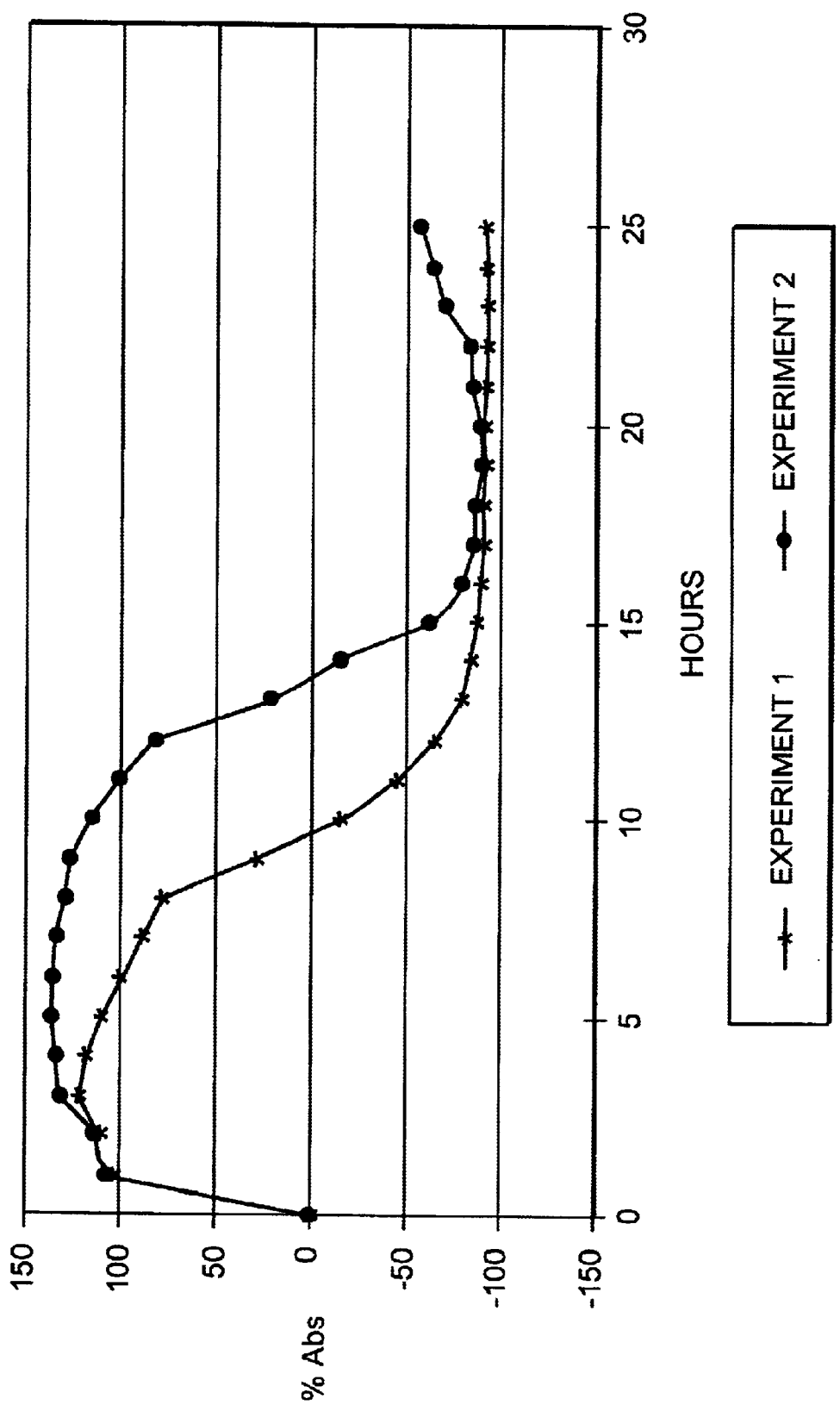
FIG. 5 shows a diagram concerning oxidation of astaxanthin in different urea treated fish oils.

As expected from the previous examples the astaxanthin concentration in experiment 1) was stable for a period of several hours. However, the astaxanthin in the oil phase of experiment 2) was stable for an even longer period of time. This is shown in FIG. 5. This means that the oil can effectively be treated with aqueous urea.

EXAMPLE 7

A commercial formulation of astaxanthin (Carophyll Pink, Roche) was added to a fodder mixture before extrusion so as to give a calculated astaxanthin concentration in the extruded product of 102 mg/kg, provided that no degradation took place during the process. Analysis of the extruded product gave a concentration of 56.0 mg/kg. When the oil in the feed mixture was substituted with oil pre-treated with urea (oil and 5% urea heated to 140° C., the oil was filtered after cooling to room temperature) the extruded product contained 70.2 mg/kg astaxanthin.

Similarly, fodder mixtures with identical concentrations of purified astaxanthin were extruded. After extrusion, the sample with untreated fish oil contained 26.0 mg/g astaxanthin, while the sample with urea-treated fish oil contained 32.2 mg/g astaxanthin.

These experiments show that addition of urea-treated fish oil protects astaxanthin from degradation during extrusion of fish fodder.

EXAMPLE 8

100 g fish oil with an initial anisidine value of 23.8, was stirred with 5% urea and heated to 140° C. After reaching this temperature, the oil was cooled to room temperature. The anisidine value of a sample of this oil was analysed to be 22.9.

100 g of the same fish oil was treated in an identical manner, except that the oil was kept at 140° C. for 20 minutes before cooling. The anisidine value of this oil after cooling to room temperature was 6.5.

This shows that it takes a certain time for the oil to react with urea in the desired manner. The exact time will depend on the composition and quality of the oil. The temperature of 140° C. is not mandatory. As shown in example 1 (FIG.1), a reduction of anisidine value is observed also at lower temperatures. By reacting the oil with urea for sufficient time a significant reduction of anisidine value will be obtained also at low temperatures. Also, the amount of 5% urea is not mandatory; depending on the quality of the oil much lower amounts would be sufficient. In the remaining examples, the oil is treated with 5% urea at 140° C. for the sake of convenience only. Other temperatures, concentrations and heating times could give similar results regarding stabilisation of pigments.

EXAMPLE 9

In all experiments below "water" means water containing 6% emulgator (glyceryl polyethylenglycol ricinoleate).

0.5 g urea and 0.5 ml water was stirred with 100 g fish oil (anisidine value 23) at ambient temperature. After 20 minutes the anisidine value of the oil was reduced to 9.0, after 2 hours it was reduced to 8.3.

An identical experiment was performed with 0.5 g urea, 5.0 ml water and 100 g of the same oil as above. After 20 minutes the anisidine value of the oil was reduced to 7.9, after 2 hours the anisidine value was reduced to 7.8.

An identical experiment was performed using 5.0 g urea and 5.0 ml water. The anisidine values were 5.7 and 2.3 after 20 minutes and 2 hours respectively.

EXAMPLE 10

1.0 g urea was stirred with 100 g fish oil (anisidine value 23) and heated to 140° C. Samples were taken at the moment this temperature was reached, and after 30 minutes. The anisidine values were analysed to be 23 and 8.9 respectively.

An identical experiment was performed with 5 g urea. The anisidine value was analysed to be 17 at the time the temperature had reached 140° C., and 6.9 after 30 minutes at this temperature.

Urea may be added in a number of ways and not only directly to a oil as described in the examples above. By production of a feed urea can be added for instance during the extruding, by vacuum coating, spray coating and by oil bath. Urea can also be added in the water phase or in solid form.

The meal which is an important ingredient in the feed is marine or vegetable. Fishmeal, which typically contains around 10% fat, is commonly used in fish feed. The fat from the fish meal is however strongly oxidised. Thus, it would be favourable to add oil treated by urea according to this invention to the meal before the pigment is brought into the feed mixture.

Besides reducing the oxidation and thus improving the quality of the fat and pigments during the production process, this invention will involve prolonged storing time for the feed. Stability of the pigment with regard to oxidation is a factor that decides for how long time the feed can be store. A pigment having an improved stability gives a feed having an increased storing time. This gives the advantageous that larger stocks may be built. In that way feed producing industries will not be that vulnerable with regard to for instance production stop.

Thus, according to the present invention it has been demonstrated that oils treated by urea and pigments which have stayed in contact with oils treated by urea are less exposed to oxidation and thereby degradation than untreated oils and pigments not being in contact with urea-treated oils. Furthermore, this invention discloses a feed having ability for being stored longer than any other similar known feed, and also a feed where the effect of the pigments are higher than in any previous known feed.

What is claimed is:

1. A method of reducing the anisidine value of a vegetable or animal oil having an anisidine value, comprising the step of treating the oil with urea for a time sufficient to lower the anisidine value of the oil.

2. The method of claim 1, further comprising the step of treating the oil with one or more antioxidants.

3. The method of claim 2, wherein the oil is treated with at least one antioxidant selected from the group consisting of tocopherol, ascorbic acid, and ascorbyl palmitate.

4. The method of claim 2, wherein the oil is treated with tocopherol and at least one antioxidant selected from the group consisting of ascorbic acid and ascorbyl palmitate.

5. The method of claim 1, wherein the oil is treated by heating the oil in the presence of urea to a temperature above the melting point of urea.

6. The method of claim 5, wherein the oil is kept at a temperature above the melting point of the urea for 20–30 minutes.

7. The method of claim 1, wherein the oil is treated with 0.1–40% by weight of urea, based on the weight of the oil to be treated.

8. The method of claim 7, wherein the oil is treated with 0.5–5% by weight of urea, based on the weight of the oil to be treated.

9. A method for stabilising a pigment against oxidation, comprising the step of mixing the pigment with an oil that has been treated by the method of claim 1.

10. The method of claim 9, wherein the pigment is selected from the group consisting of astaxanthin and canthaxanthin.

11. The method of claim 9, further comprising the step of mixing the pigment with one or more antioxidants.

12. The method of claim 9, further comprising the step of removing unreacted urea from the oil before adding the oil to the pigment.

13. A feed for salmonids comprising a protein content of 25–70% by weight, a lipid content of 5–60% by weight, a carbohydrate content of 0–40% by weight, and one or more pigments, wherein the lipid content comprises a marine oil or vegetable oil that has been treated by the method of claim 1.

14. The feed of claim 13, wherein the feed additionally contains at least one component selected from the group consisting of fillers, adhesives, preservatives, vitamins, and minerals, but the total amount of components over and above the protein, lipid, carbohydrate, and pigment content is no more than 15%, based on the total weight of the feed.

15. The feed of claim 13, wherein the marine oil or vegetable oil treated with urea is also treated with one or more antioxidants.

16. The feed of claim 13, wherein the one or more pigments comprises a pigment selected from the group consisting of astaxanthin and canthaxanthin.

17. The feed of claim 16, wherein the oil is marine oil.

18. The feed of claim 17, wherein the one or more pigments comprises astaxanthin.

19. The method of claim 1, wherein the oil is treated with urea by stirring the oil with water, urea, and emulsifier.

20. A method of upgrading a vegetable or animal oil that has undergone oxidation to the extent that the oil contains carbonyl-group-containing degradation products at a sufficient level to give the oil an anisidine value, comprising the steps of (a) mixing the oil with urea, (b) keeping the oil in contact with the urea under conditions in which the urea will react with said degradation products, for a time sufficient to reduce the oil's anisidine value and (c) removing at least some of the urea from said mixture.

21. The method of claim 20, wherein the mixture of oil and urea is heated to a temperature above the melting point of urea and, in step (c), the mixture is cooled sufficiently that urea precipitates, following which the precipitated urea is separated from the treated oil.

22. The method of claim 21, wherein the oil is marine oil.

* * * * *